(12) United States Patent
Mann et al.

(10) Patent No.: US 8,375,439 B2
(45) Date of Patent: Feb. 12, 2013

(54) DOMAIN AWARE TIME-BASED LOGINS

(75) Inventors: Vijay Mann, Gurgaon (IN);
Ranganathan Vidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/098,328

(22) Filed: Apr. 29, 2011

(65) Prior Publication Data
US 2012/0278881 A1 Nov. 1, 2012

(51) Int. Cl.
*G06F 7/04* (2006.01)
*H04L 29/06* (2006.01)
(52) U.S. Cl. .......................................... 726/17; 713/151
(58) Field of Classification Search .................... 726/17; 713/151
See application file for complete search history.

(56) References Cited

U.S. PATENT DOCUMENTS

| | | | |
|---|---|---|---|
| 5,889,952 A | 3/1999 | Hunnicutt et al. | |
| 6,519,647 B1 | 2/2003 | Howard et al. | |
| 6,947,989 B2 | 9/2005 | Gullotta et al. | |
| 7,017,183 B1 | 3/2006 | Frey et al. | |
| 7,167,983 B1 | 1/2007 | Tiller et al. | |
| 7,249,176 B1 | 7/2007 | Salas et al. | |
| 7,328,210 B2 | 2/2008 | Barchi et al. | |
| 7,591,015 B2 | 9/2009 | Cargille et al. | |
| 7,954,150 B2 | 5/2011 | Croft et al. | |
| 2003/0009685 A1 | 1/2003 | Choo et al. | |
| 2003/0041154 A1 | 2/2003 | Tran | |
| 2003/0191747 A1 | 10/2003 | Espino | |
| 2004/0239700 A1 | 12/2004 | Baschy | |
| 2004/0243835 A1 | 12/2004 | Terzis et al. | |
| 2006/0248599 A1* | 11/2006 | Sack et al. | ...................... 726/27 |
| 2006/0259487 A1 | 11/2006 | Havens et al. | |
| 2007/0011136 A1 | 1/2007 | Haskin et al. | |
| 2007/0016583 A1 | 1/2007 | Lempel et al. | |
| 2007/0039045 A1 | 2/2007 | McKee et al. | |
| 2007/0214497 A1 | 9/2007 | Montgomery et al. | |
| 2007/0282951 A1* | 12/2007 | Selimis et al. | ................ 709/205 |

(Continued)

FOREIGN PATENT DOCUMENTS

| | | |
|---|---|---|
| WO | 2009023586 | 2/2009 |
| WO | 2010127380 | 11/2010 |

OTHER PUBLICATIONS

IBM, "Welcome to the AIX 6.1 Information Center", http://publib.boulder.ibm.com/infocenter/aix/v6r1/index.jsp?topic=/com.ibm.aix.doc/base/aixinformation.htm, accessed on Aug. 3, 2010, published in 1989, 1 page.

(Continued)

*Primary Examiner* — Techane Gergiso
(74) *Attorney, Agent, or Firm* — Kolisch Hartwell, PC; Steven L. Bennett

(57) ABSTRACT

A method may comprise determining, in an operating system instance, that a login access is being attempted by a user at an access time on an object. A domain identifier associated with the user may be determined. A set of one or more domain identifiers may be accessed that may be associated with the object and that identify one or more domains. One or more domain isolation rules may be accessed and evaluated that may be associated with the operating system instance for permitting an attempted login access to the object based on whether a domain identifier associated with the user is one of the domain identifiers in the set of domain identifiers associated with the object for during a time period. A permit or deny indication may be returned based on whether or not login access is permitted on the object at the access time.

25 Claims, 4 Drawing Sheets

U.S. PATENT DOCUMENTS

| | | | |
|---|---|---|---|
| 2007/0297396 A1* | 12/2007 | Eldar et al. | 370/356 |
| 2008/0071804 A1 | 3/2008 | Gunda et al. | |
| 2008/0126355 A1 | 5/2008 | Rowley | |
| 2008/0162707 A1 | 7/2008 | Beck et al. | |
| 2008/0289036 A1 | 11/2008 | Kandasamy et al. | |
| 2008/0307486 A1 | 12/2008 | Ellison et al. | |
| 2009/0235167 A1 | 9/2009 | Boyer et al. | |
| 2010/0191881 A1 | 7/2010 | Tauter et al. | |
| 2012/0030242 A1 | 2/2012 | Nakamura et al. | |
| 2012/0059799 A1 | 3/2012 | Oliveira et al. | |
| 2012/0102079 A1 | 4/2012 | French et al. | |
| 2012/0151552 A1 | 6/2012 | Kandasamy et al. | |
| 2012/0185510 A1 | 7/2012 | Desai et al. | |

OTHER PUBLICATIONS

Barkley, "Comparing Simple Role Based Access Control Models and Access Control Lists", Proceeding RBAC '97 Proceedings of the second ACM workshop on Role-based access control, http://delivery.acm.org/10.1145/270000/266769/p127-barkley.pdf?key1=266769&key2=2108522921&coll=ACM&CFID=1856933&CFTOKEN=5839503, accessed on Dec. 13, 2010, Aug. 11, 1997, pp. 127-132.

Shepler et al., "NFS version 4 Protocol", Network Working Group, http://tools.ietf.org/html/rfc3010, accessed on Aug. 25, 2010, Dec. 2000, 213 pages.

Gorman, "Understanding the Linux Virtual Memory Manager", http://www.phptr.com/perens2004, publication date unknown, 748 pages.

IBM, "Concepts, Planning, and Installation Guide", General Parallel File System, Version 3.1, Apr. 2006, 144 pages.

IBM, "Shapshots Reinvented: IBM XIV Storage Systems", Sep. 2008, 17 pages.

Sun Microsystems, "Lustre File System: High-Performance Storage Architecture and Scalable Cluster File Systems", White Paper, http://www.raidinc.com/pdf/whitepapers/lustrefilesystem_wp.pdf, Oct. 2008, 20 pages.

Abdullah et al., "FreeBSD Handbook", Chapter 13, Section 8, http://www.freebsd.org/doc/en/books/handbook/users-groups.htlm, accessed on Aug. 25, 2010, published in 2010, 2 pages.

FreeBSD, "13.8 Groups", FreeBSD Handbook: Chapter 13 Users and Basic Account Management, http://www.freebsd.org/doc/handbook/users-group.htlm, accessed on Aug. 25, 2010, publication date unknown, 2 pages.

Shwartz et al., "Quality of IT Service Delivery—Analysis and Framework for Human Error Prevention", Service-Oriented Computing and Application (SOCA), 2010 IEEE International Conference, Dec. 13-15, 2010, 8 pages, Perth, Washington.

Madduri et al., "Towards Mitigating Human Errors in IT Change Management Process", IBM Corporation, Lecture Notes in Computer Science, 2010, pp. 658-663,vol. 6470/2010.

Tivoli, "Architectural overview of a clustered environment", Composite Application Manager for Response Time Tracking, Version 6.0, http://publib.boulder.ibm.com/infocenter/tivihelp/v3r1/index.jsp?topic=%2Ecom.ibm.itcamrtt.doc_6.0%2FITCAMfTT_installConfig10.htm, publication date unknown, 3 pages, Dec. 7, 2005.

US Patent and Trademark Office, U.S. Appl. No. 13/006,621, filed Jan. 14, 2011, Desai et al.

IBM Corporation, LDAP Authentication, Sterling B2B Integrator: Security, Chapter 5, Version 5. 2, Copyright 2000, 142 pages.

Luiz Ernesto Pinheiro Malere, Authentication using LDAP, LDAP Linux HOWTO, Additional Information and Features, http://tldp.org/HOWTO/LDAP-HOWTO/authentication.html, Mar. 18, 2007, vol. 10, Chapter 6.2, 2 pages.

Cendio AB, Authentication against LDAP servers, ThinLinc Administrator's Guide for ThinLinc 3.1.1post, http://www.cendio.com/downloads/updates/b3548/client-cd/doc/adminguide/html/LDAP-auth.html, Copyright 2010, Chapter 9.4, 40 pages.

Erik Webb, Using LDAP for Authentication is Never Best Practice, erikwebb dot net, http://erikwebb.net/blog/using-ldap-authentication-never-best-practice, Published Nov. 6, 2011, 3 pages.

US Patent and Trademark Office, Office Action for U.S. Appl. No. 13/006,621, Jul. 2, 2012, 22 pages.

IBM Corp., Domain RBAC, http://publib.boulder.ibm.com/infocenter/aix/v7r1/index.jsp?topic=/com.ibm.aix.security/doc/security/domain_rbac.htm, accessed on Apr. 29, 2011, Copyright 1989, 2012, 4 pages.

IBM Corp., Role Based Access Control (RBAC), http://publib.boulder.ibm.com/infocenter/aix/v7r1/index.jsp?topic=/com.ibm.aix.security/doc/security/rbac.htm, accessed on Apr. 29, 2011, Copyright 1989, 2012, 1 page.

IBM Corp., Enhanced RBAC Mode, http://publib.boulder.ibm.com/infocenter/aix/v6r1/index.jsp?topic=/com.ibm.aix.security/doc/security/rbac_enh_mode.htm, accessed on Apr. 29, 2011, Copyright 1989, 2012, 2 pages.

FreeBSD, 13.8 Groups, FreeBSD Handbook: Chapter 13 Users and Basic Account Management, http://www.freebsd.org/doc/handbook/users-group.htlm, accessed on Aug. 25, 2010, Copyright 1995, 2012, 2 pages.

Mel Gorman, Understanding the Linux Virtual Memory Manager, Prentice Hall Professional Technical Reference, http://www.phptr.com/perens2004, Copyright 2004, 748 pages.

Tivoli, "Architectural overview of a clustered environment", Composite Application Manager for Response Time Tracking, Version 6.0, http://publib.boulder.ibm.com/infocenter/tivihelp/v3r1/index.jsp?topic=%2Ecom.ibm.itcamrtt.doc_6.0%2FITCAMfTT_installConfig10.htm, Updated Dec. 7, 2005, 3 pages.

Philippe Balbiani et al., A logical approach to dynamic role-based access control, AIMSA '08 Proceedings of the 13th International Conference on Artifical Intelligence: Methodology, Systems, and Applications, Copyright 2008, 17 pages.

Chandolu et al., Introduction to Domain RBAC, IBM developerWorks, http://www.ibm.com/developerworks/aix/library/au-introdomainrbac/index.html, Sep. 20, 2011, 10 pages.

IBM Corp., Security in workload partition environments, Workload Partition Management in IBM AIX Version 6.1, 2008, 56 pages.

IBM Corp., Role Based Access Control, AIX V6 Advanced Security Features: Introduction and Configuration, 2007, 85 pages.

IBM Corp., Domain RBAC, 4 pages, http://publib.boulder.ibm.com/infocenter/aix/v7r1/index.jsp?topic=/com.ibm.aix.security/doc/security/domain_rbac.htm, accessed on Apr. 29, 2011, publication date unknown.

IBM Corp., Role Based Access Control (RBAC), 1 page, http://publib.boulder.ibm.com/infocenter/aix/v7r1/index.jsp?topic=/com.ibm.aix.security/doc/security/rbac.htm, accessed on Apr. 29, 2011, publication date unknown.

IBM Systems Magazine, Privileges Granted as Needed, Jan. 2010, 3 pages, http://www.ibmsystemsmag.com/aix/administrator/systemsmanagement/Privileges-Granted-as-Needed/.

IBM Corp., Enhanced RBAC Mode, 2 pages, http://publib.boulder.ibm.com/infocenter/aix/v6r1/index.jsp?topic=/com.ibm.aix.security/doc/security/rbac_enh_mode.htm, accessed on Apr. 29, 2011, publication date unknown.

Ken Milberg, Cloud computing on AIX and POWER, Apr. 7, 2009, 11 pages, IBM Corp.

Philippe Balbiani et al., A logical approach to dynamic role-based access control, 17 pages (date unknown), copyright 2008.

Rajesh K. Jeyapaul, Understanding advanced AIX features: Role-based access control in simple steps, Jun. 23, 2009, 11 pages, IBM Corp.

Yuri Demchenko et al., Domain Based Access Control Model for Distributed Collaborative Applications, Second IEEE International Conference on e-Science and Grid Computing, Dec. 2006, 8 pages.

D.C. Robinson et al., Domain-based access control for distributed computing systems, Abstract from Software Engineering Journal, Sep. 1988, 1 page.

Peter Mell et al., The NIST Definition of Cloud Computing (Draft), Recommendations of the National Institute of Standards and Technology, Jan. 2011, 7 pages.

* cited by examiner

DOMAIN AWARE TIME-BASED LOGINS

BACKGROUND

Embodiments of the inventive subject matter generally relate to the field of computers, and, more particularly, to login access to a computer system.

Current computer system access control mechanisms in operating systems control access to resources such as login access, and file access. Some operating systems, such as conventional UNIX or UNIX-like operating systems, implement access control mechanisms of coarse granularity. On a UNIX system or UNIX-like system, system administration activities are typically performed through a root account. System administrators responsible for the administration of the system share/manage the password to the root account or use access control tools that allow access to the desired services after sufficient authentication. Some operating systems allow a finer granularity of control through role based access control (RBAC) mechanisms, where different usernames are assigned roles and only specified roles are allowed access.

BRIEF SUMMARY

One or more embodiments of the present invention may include methods, systems, and computer program products for determining login access. According to an embodiment of the present invention, a method may comprise determining, in an operating system instance, that a first login access is being attempted by a first user at a first access time on an object. A first domain identifier associated with the first user may be determined. The first domain identifier may identify a first domain representing a first organizational entity of a plurality of domains representing a plurality of organizational entities. A set of one or more domain identifiers may be accessed that may be associated with the object. The set may identify one or more domains of the plurality of domains representing one or more organizational entities of the plurality of organizational entities. One or more domain isolation rules may be accessed that may be associated with the operating system instance for permitting an attempted login access to the object during at least a first time period of a plurality of time periods by one or more domains based on whether a domain identifier associated with the first user is one of the domain identifiers in the set of domain identifiers associated with the object for during the first time period. The one or more domain isolation rules may be evaluated to determine whether the first login access is permitted on the object at the first access time. A permit indication may be returned that the first login access is permitted on the object if the domain isolation rules indicate that the first domain identifier represents a domain that is permitted for the object at the first access time. A deny indication may be returned that the first login access is not permitted on the object if the domain isolation rules indicate that the first domain identifier represents a domain that is not permitted for the object at the first access time.

DETAILED DESCRIPTION

Figure 1:
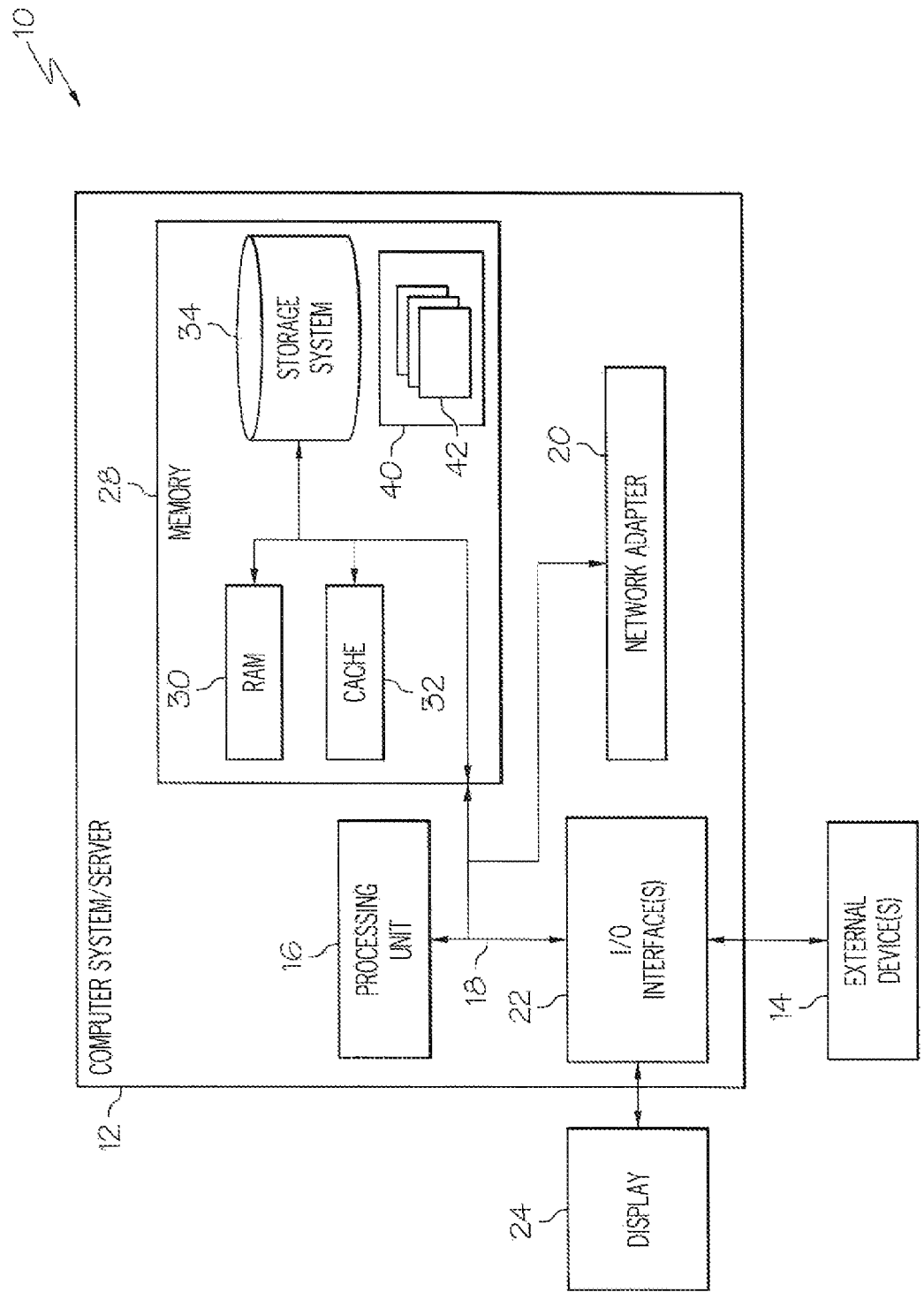
FIG. 1 depicts a cloud computing node according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention may be implemented in conjunction with any other type of computing environment now known or later developed, including a distributed environment like clusters of nodes in a network wherein a node represents an independently operating system.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 may be stored in a kernel of the operating system.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
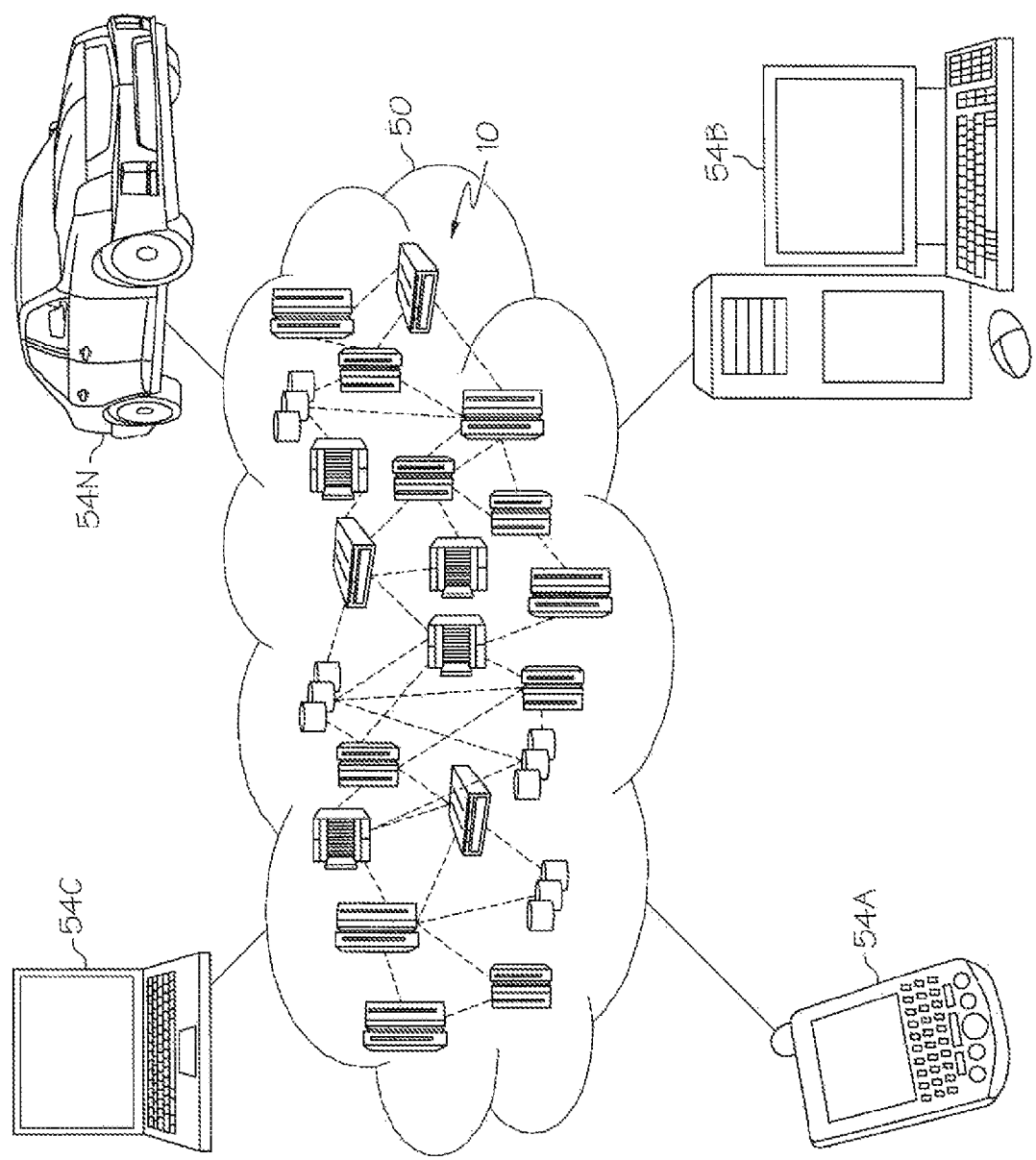
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
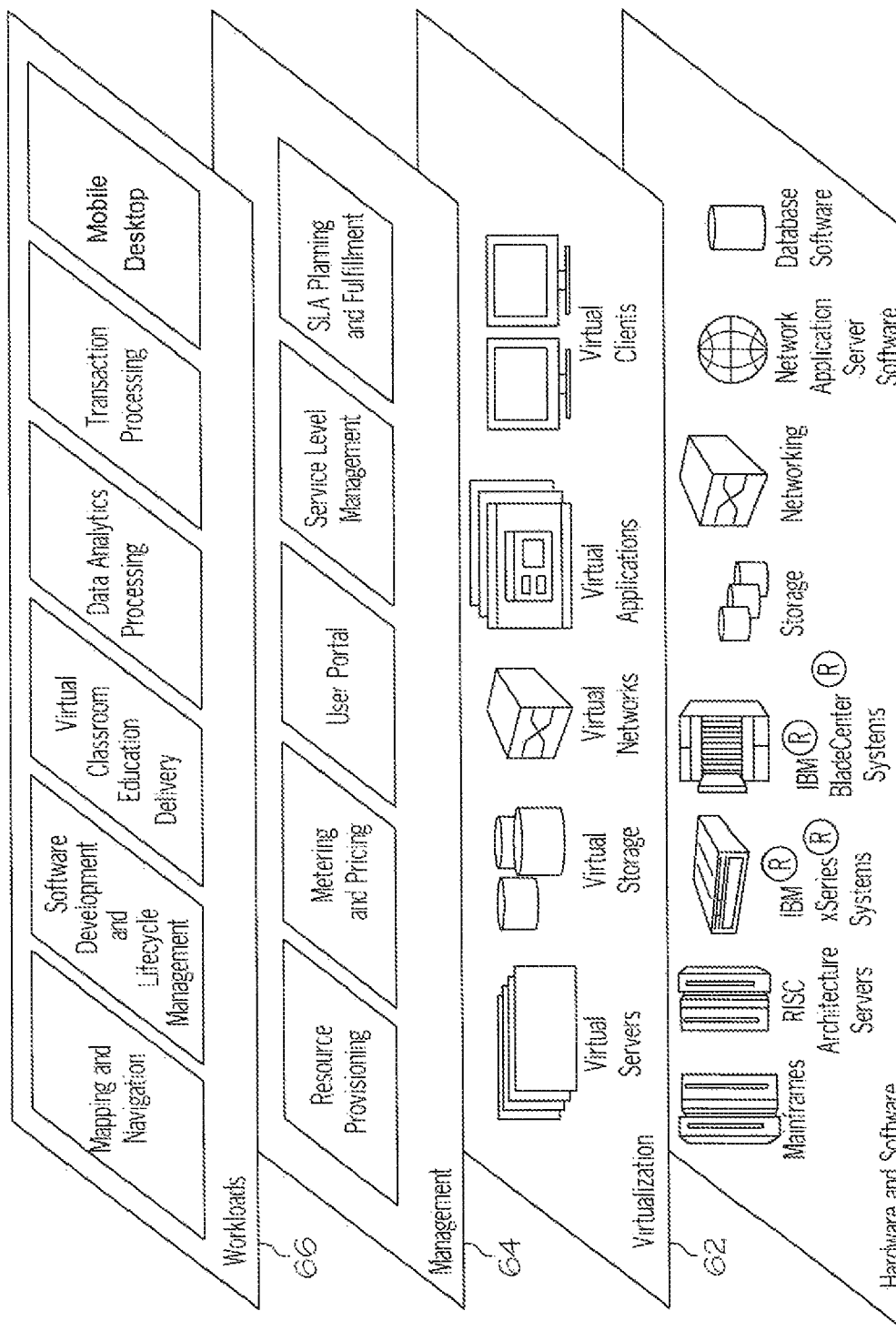
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification, such as login access, for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted above, systems, methods and computer program products are disclosed herein for determining login access.

An operating system ("OS") instance may support access to one or more objects (e.g., devices, file systems, volume groups, files, applications, etc.) for different departments of an organization and for different purposes (e.g., management of the object, writing to the object, viewing the object, invoking an object, etc.). For example, an OS instance may support different applications/systems and data for an information technology department, a human resources department, and a finance department. The OS instance may support an electronic mail system for all three departments. The OS instance may also support a problem and ticketing system for the information technology department, a bookkeeping application for the finance department, and a job application database for the human resources department. An administrator may create domains for these different departments for any suitable administrative purpose, such as to isolate the objects of the departments (e.g., database records, department file systems, etc.) for confidentiality reasons, or to conform to organizational task divisions (e.g., different information technology departments may support the different departments).

In some embodiments, a root user, super user, etc. can define domains, associate domains with users and objects, and/or create domain isolation rules. Domains can be defined to represent different entities (e.g., different departments, work groups of an organization). The domain can be defined to represent any grouping of users desired, including of users from more than one entity, organization, etc. Defining a domain can comprise establishing an identifier for a domain (e.g., a unique domain name, a unique alphanumerical or numerical identifier, etc.). User identifiers and/or user credentials for different users can be associated with the appropriate domain or domains for the different users. A set of domain isolation rules can be defined that govern access to objects based on the domains. A kernel process associated with the OS instance, for example, can evaluate the set of rules that specify which domains are permitted access to which object(s) during which time period. When a specific user attempts to access an object to perform an operation (e.g., mount a file system or device, create a volume group, view or write to a file, etc.), the kernel process may evaluate rules for determining whether the operation by the specific user is permitted to proceed on the object at the access time.

For example, a root user can create a domain for information technology administrators. The root user can also create a database domain. The root user can define a rule that allows access to manage database objects during a specific time period for users who are assigned to both the information technology administrator domain and the database domain.

Figure 4:
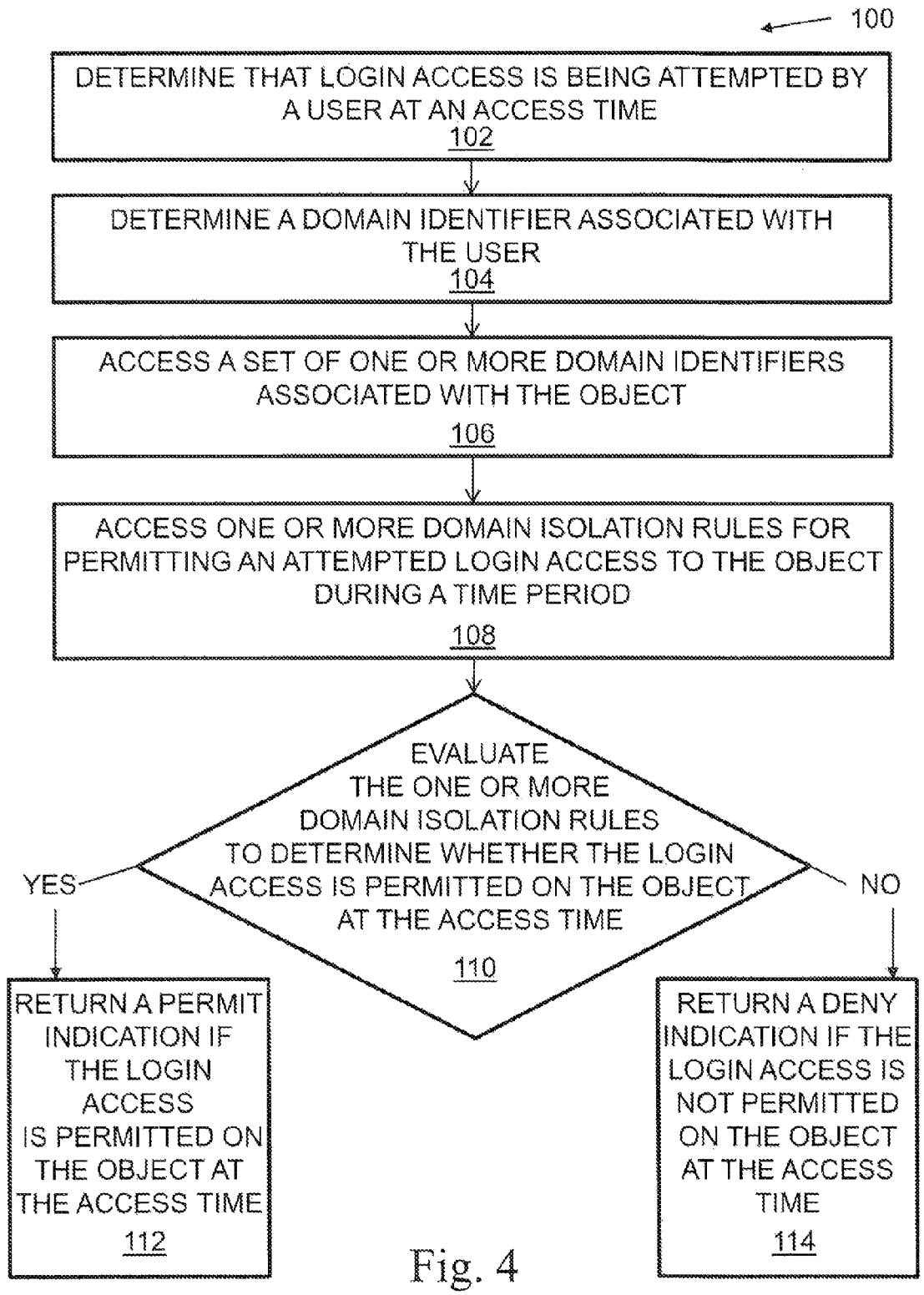
FIG. 4 depicts an exemplary method according to an embodiment of the present invention.

Referring now to FIG. 4, an exemplary method 100 of determining login access is shown. In a step 102, login access by a user to an object at an access time may be determined. The access time may indicate the date and clock time at which the user is attempting to gain login access to the object. To attempt login access, the user may enter login information (e.g., username, password, etc.) into a computing device for verification determination by the OS instance.

A user repository may be associated with the OS instance that includes user data (e.g., user name, user password, user profiles, user credentials, etc.) of users. The OS instance may initiate a procedure to compare the login information of the user to the user repository as part of validating if the user can access the OS instance and the object.

The user repository may be stored in a location that is accessible to the OS instance so that the OS instance can validate the user attempting access. For example, the user repository can be stored in a hard drive, server space, and/or kernel space operatively connected to the OS instance. All, part, or attributes of the user repository may be so stored.

In a step 104, a domain identifier associated with the user may be determined The domain identifier may identify a domain that represents an organizational entity. Each domain identifier may uniquely represent a different organizational entity. The domain identifier may include a symbol, a letter, a number, a combination thereof, etc. that is suitable for identifying the domain.

One or more domain identifiers associated with the user may be stored in a location that is accessible to the OS instance so that the OS instance can determine the domain identifier(s) of the user attempting access. For example, the respective domain identifier(s) of each user can be stored in a hard drive, server space, and/or kernel space operatively connected to the OS instance. All, part, or attributes of the domain identifiers can be so stored.

For example, a domain identifier HR may be used to represent the human resources domain representing the human resources department, and a domain identifier IT may be used to represent the information technology domain representing the information technology department. Other organizational entities (e.g., finance, crisis control, management, etc.) may also have users requiring access to the OS instance, and a unique domain identifier can be associated with each such domain. A domain identifier can be associated with one or more users (e.g., Users 1 and 2 with HR; User 3 with IT). A user can be associated with one or more domain identifiers (e.g., User 1 with IT only; User 2 with IT and HR).

In a step 106, a set of one or more domain identifiers is accessed that may be associated with the object. The set may be stored in a location that is accessible to the OS instance so that the OS instance can access the domain identifier(s) associated with the object. For example, the set can be stored in a hard drive, a server space, and/or a kernel space operatively connected to the OS instance. All, part, or attributes of the set can be so stored.

Continuing with the above example, the set of one or more domain identifiers may indicate that either, both, or neither of the domain identifiers HR and IT are associated with the object on which the login access is being attempted.

In a step 108, one or more domain isolation rules associated with the OS instance may be accessed. The rules may define one or more time periods during which a respective object can be accessed by one or more domains. The rules may define whether a domain identifier associated with a user is one of the domain identifiers in the set of domain identifiers associated with an object that is permitted access during a time period being accessed. The rules may indicate any time period during which one or more domain identifiers is associated with one or more objects. The rules may indicate an object identifier, an object type, permitted domains, and/or denied or conflict domains. The domain isolations rules may indicate any or all of the following rules, or other appropriate rules: allow not more than "n" users of the same domain to login at the same time; allow either users of domain 1 or domain 2 to login in during a specific period; allow n1 users of domain 1 and n2 users of domain 2 to login during a specific period; and/or allow users of two different domains to login in a mutually exclusive mode during the same time or time period.

Continuing with the above example, the rules may indicate that the domain identifier IT is permitted access to a particular object during a first time period, and the domain identifier HR is not permitted access during the first time period. The rules may indicate that the domain identifier HR is permitted access to that particular object during a second time period different from the first time period, and the domain identifier IT is not permitted access during the second time period. The rules could indicate, for example, that the domain identifier HR is associated with an object on Mondays and Wednesdays and the domain identifier IT is associated with the object on Tuesdays and Thursdays. The rules may indicate that the domain identifier HR is permitted access to the object at 5 pm or from 5 pm to 6 pm on Mondays and the domain identifier IT is permitted access to the object at 1 pm or from 1 pm to 4:59 pm on Monday. The rules may indicate that the domain identifiers HR and IT are permitted access to the object every other Monday.

In some embodiments, when the user is associated with more than one domain, the rules may specify how access is handled for such a user. For example, even though the user may be a member of a permitted domain during a given time period, the rules may specify to deny access if the user is also a member of a denied domain during the given time period. The rules may be indicated by a flag that represents a constraint of "ANY" or "ALL" domains for an object. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Continuing with the above example, the rules may indicate an ALL flag, such that the domain identifiers HR and IT are both required for a user to access the object every other Monday. The rules may indicate an ANY flag, such that either HR or IT is required for a user to access the object every other Monday.

In some embodiments, the domain isolation rules may allow for dynamic assignment of a domain to the user depending on the access time by the user. For example, the user may be associated with more than one domain identifier representing more than one domain. The rules may indicate that the user is permitted access to the object during a first time period if the user is associated with a first domain identifier during the first time period, and a second time period different from the first time period if the user is associated with a second domain identifier during the second time period. The rules may indicate to deny the user access outside these two time periods. The rules may also specify that the login access by the user be attributed or assigned to the first domain identifier during the first time period and to the second domain identifier during the second time period.

Continuing with the example above, a user may be associated with the domain identifiers HR and IT, and the rules may specify that HR is permitted to access the object during the first time period and IT is permitted to access the object during the second time period. If the user accesses the object during the first time period, then the user would be permitted access and the user's use may be attributed or assigned to the human resources department. If the user accesses the object during the second time period, then the user would be permitted access and the user's use may be attributed or assigned to the information technology department. In this way, resource provisioning, metering, and pricing of time can be accomplished.

The domain isolation rules may be stored in a location that is accessible to the OS instance so that the OS instance can access the rules. For instance, all or a subset of the domain isolations rules associated with the OS instance may be stored in a hard drive, a server space, and/or a kernel space operatively connected to the OS instance. All, part, or attributes of the domain isolations can be so stored.

In a step 110, the domain isolation rules may be evaluated to determine whether the login access is permitted on the object at the access time.

In some embodiments, a kernel process may evaluate the domain isolation rules for the object and determine whether the domain of the user is indicated as a permitted domain. The kernel process may also determine whether the rules indicate that a user is required to be a member of any or all indicated permitted domains, a member of a denied or conflict domain, etc. A kernel command parser may receive an instruction from user space that targets an object. User information may be loaded into the kernel space from the user repository in response to a user logging into a computing device in communication with the kernel space.

If an operation is permitted to be performed on the object at the access time, then operations continue at a block 112. If the user credentials indicate a domain membership that satisfies the domain isolation rules for the object at the access time, then an indication may be returned that the user is permitted access to the object. For example, an allow indication may be returned to a command parser, which permits the user to access the object.

If an operation is not permitted to be performed on the object at the access time, then operations continue at a block 114. An indication may be returned that the user is not permitted access to the object if the user is determined, at the access time, to be a member of a denied domain or is not a member of a permitted domain. If the user is not a member of a permitted domain, then the operation initiated by or associated with the user may not be carried out. A denied indication may be returned to the invoking code (e.g., a command parser). A notification may then be displayed that access is not permitted. For example, an error message may be displayed. A message may also be displayed indicating the time period (s) during which the user is permitted access to the object The depicted flowchart is intended to aid in understanding the inventive subject matter, and should not be used to limit embodiments. Embodiments may perform additional operations, fewer operations, operations in a different order, operations in parallel, etc., than depicted herein. For instance, an indication may not be returned that an operation is not permitted access to an object. The executing code that evaluates the domain isolation rule may invoke an error handler or generate the deny message itself. Further, the domain isolation rules may not be indexed by an object identifier. The domain isolation rules may be indexed by object type and then by object identifier. Hence in this example, the rule evaluation code would determine the type of the object and initially access the domain isolation rules with the object type.

An embodiment of the present invention can be used in a system or an OS instance that implements a role based access control (RBAC) environment. For example, a user A may be associated with an administrator role that may allow performance of operations to mount devices and/or file systems. The user A may be a member of the finance department and associated with the domain identifier FINANCE. A root user may have configured a set of domain isolation rules to indicate that FINANCE is a permitted domain/domain identifier for an object device DSK1 every Monday and for an object device DSK2 every Tuesday. If the user A attempts to mount DSK1 on Monday, the OS instance will allow the operation(s) to mount DSK1 to proceed. If the user A attempts to mount DSK2 on Monday, the OS instance will enforce the domain isolation rules for DSK2 and not allow the user A to mount DSK2. Hence, an organization can restrict login access by time and based on roles, and isolate objects based on domains.

In another embodiment, the domain based access control of objects can be implemented with domain based access control sets. Examplary objects that can be governed by domain isolation rules and a domain based access control set include files, file sets, and directories. Domains can be granted different permissions to file type objects for different time periods. For example, a domain identifier IT indicating an information technology domain may be granted read permission of a file every day from 9 am to 12 pm, and write permission for that file every day from 1 pm to 5 pm. In response to a system call for accessing a file, an OS instance process may examine incoming mode bits and determine that a set of access control sets are associated with the file. The OS instance process may evaluate the domain identifiers associated with the user attempting access against the domain based access control set and domain isolation rules to determine whether to grant access, and what type of access to grant, to the file during a given time period.

Another embodiment can be configured to ensure that login access is only permitted during the time period needed. The embodiment may include a method to define time-based login policies based on domains and to allow or deny login based on time domain aware policies. Login access may be associated with domain aware policies to which users are bound. Domain aware logins may provide users with the ability to access and manage resources based on domain policies and time period. Domain aware logins may allow exclusive access to one or more sets of resources, objects, etc. of the system, thereby enabling granularity for user access via logins.

Another embodiment can allow the management of problem and change tickets that require execution during a specific time period. Without proper access control policies, a user may log in and execute a ticket at the incorrect time. This can result in production outages.

Another embodiment can include a method for enabling time-based dynamic domains support to users at login time. The domain may be attached to the user on the fly dynamically when the user logs into the system based on a time-based policy. This may allow dynamic domaining based on the domain policy and time. In this way, the same user ul can be assigned roles to perform management jobs on respective resources for each of a plurality of departments thereby enabling dynamic domaining based on periods. In this way, a user can be enabled to take on different domain roles at different points in time. For instance, one system administrator may be responsible for activities associated with an OS instance shared by more than one department. In such cases, the departments may want to schedule the system down time or change window time according to their specific needs. Furthermore, each department may want to ensure that the system administrator only has access to each department's data only during the time period when authorized. The domain isolations rules can be configured to ensure that login access is only permitted during the time period needed by the respective department.

For example, an OS instance may be shared by the finance and human resources departments and a system administrator may be responsible for accessing a shared object to back up the data for both departments by logging into the OS instance as user "backupadmin." The "backupadmin" user can be associated with the FINANCE and HR domains/domain identifiers such that the "backupadmin" user can use the same user name and password to login associated with FINANCE on Fridays from 5 to 6 pm and with HR on Mondays from 9 to 10 am. Once the user is permitted login access, access to all resources (files, directories) may honor both user level and domain level permissions.

In another embodiment, the OS instance may be delivered in a cloud computing environment. The OS instance may be created by a workload partition (WPAR) or a logical partition (LPAR). The WPAR or LPAR may be delivered in the cloud. A company may have several departments (or silos) that may want to share the cloud resources on a cost-sharing and time-sharing basis, or a group of companies may similarly want to share cloud resources. Time-based login access based on domain aware policies may allow for subleasing an LPAR or WPAR among the various departments within the same organization. To handle such requirements and to appropriately bill the departments for their usage of the cloud resource, the organization may sublet a cloud resource to the different departments for use during different time periods. To achieve this subleasing while ensuring that data for various departments is kept secured and not exposed to each other, a policy may be created to allow for time-based login access by department/silo with time-based expiration of access.

As an example, an organization may lease one or more LPARs or WPARs from a cloud vendor, and the human resource and payroll departments of the organization may need to share a packaged application running on the WPAR. This packaged application may manage all human resources details of employees in that organization and this includes payroll information. Since the application has been configured to run as user "hrms," both the human resource and payroll departments need to use the same username to access this WPAR. However, the organization may want to ensure that these departments are given access that is mutually exclusive such that no person from human resources can get access to payroll data and vice versa. An embodiment of the present invention may enable creating a time based login policy that grants access permission to user "hrms" associated with the domain identifier PAYROLL of the payroll department for the last 5 days every month and to user "hrms" associated with the domain identifier HR of the human resources department for the remaining days every month. This may also help the organization to bill its different departments for their usage of the cloud resources.

As another example, an organization may lease an LPAR in the cloud and create a WPAR0 and WPAR1 from the LPAR. The organization may have different departments identified with domain identifiers, such as HR, SALES, PAYROLL and ADMIN, that share WPAR0 and the organization may desire to sublease the resource objects of WPAR0 on a time-period basis to these departments. WPAR0 and/or the objects of WPAR0 may be associated with domain identifiers representing domains of each department, such as the domain identifiers HR, SALES, PAYROLL, and ADMIN. A domain isolation rule can be set so that an object (e.g. application, database application, file, ports, etc.) associated with the domain identifier HR that resides on WPAR0 can only be accessed by a user associated with the domain identifier HR during certain times of the day, month, or year. Login access for a user associated with HR to the OS instance is therefore controlled by a policy and time based secure login.

An embodiment of the present invention may be implemented that includes system calls that may be defined, such as set_dom4instance( ) & get_dom4instance( ). The system calls may be invoked from a utility, such as /usr/sbin/dom4unix. A first system call, such as set_dom4instance( ), may download the domain isolation rules for the OS instance from a user space into a kernel space. The rules may include the following information for an object: object name; domains associated with the object; object type; conflict sets; and/or security flags. A second system call, such as get_dom4instance( ), may enable fetching the rules from the kernel as part of the validation of login access. A global kernel structure may be maintained containing the partition id for every OS instance with mapping of domain definitions, sets, and/or rules for the same.

In another embodiment, domain aware login policies may be used as part of the login configuration. When a user attempts to login an OS instance, the OS instance may attempt to verify the user's identity. An "init" process may invoke a utmpd (e.g., utmp daemon) and tsm (terminal service management). The set of current active users on the system can be obtained from a utmpd structure, which may be defined in a flat file (e.g., /etc/utmp). Verification of active users during the login process can be manipulated with utmp entries. Once the user's account and identity are verified by the login utility before setting the process credential and environment, domain checks may be enabled and verified across the policy/rules defined with respect to a given timeframe or period. A get_dom4instance( ) system call may be invoked from login to retrieve domain rules stored in a kernel. The domains associated with the user can be compared to the domains of the OS instance and/or the object being accessed for the login time. If the user has no domains of the OS instance and/or the object being accessed, then the OS instance may apply a default policy (e.g., deny login access).

A console login utility may enable a user with domains associated to log into the software partition from a global OS instance when no network connection exists. For dynamic domaining, the user login credentials may have a domain mapped with the user at the instance of login time based on a configuration attached to the user.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining, in an operating system instance, that a first login access is being attempted by a first user at a first access time on an object and that a second login access is being attempted by a second user at a second access time on the object;
   determining a first domain identifier associated with the first user and a second domain identifier associated with the second user, wherein the first domain identifier identifies a first domain and the second domain identifier identifies a second domain, the first and second domains respectively representing a first organizational entity and a second organization entity of a plurality of domains representing a plurality of organizational entities;

accessing a set of one or more domain identifiers associated with the object, wherein the set identifies one or more domains of the plurality of domains representing one or more organizational entities of the plurality of organizational entities;

accessing one or more domain isolation rules associated with the operating system instance for permitting an attempted login access to the object during at least a first time period of a plurality of time periods by one or more domains based on whether a domain identifier associated with the first user is one of the domain identifiers in the set of domain identifiers associated with the object for during the first time period;

evaluating the one or more domain isolation rules to determine whether the first login access is permitted on the object at the first access time;

returning a permit indication that the first login access is permitted on the object if the domain isolation rules indicate that the first domain identifier represents a domain that is permitted for the object at the first access time and if the first access time is during the first time period, and returning a deny indication that the first login access is not permitted on the object if the domain isolation rules indicate that the first domain identifier represents a domain that is not permitted for the object at the first access time and if the first access time is during a second time period different from the first time period and the first domain identifier is not one of the domain identifiers in the set of domain identifiers associated with the object for during the second time period;

evaluating the one or more domain isolation rules to determine whether the second login access is permitted on the object at the second access time;

returning the permit indication for the second user if the second access time is during the second time period and the second domain identifier is one of the domain identifiers in the set of domain identifiers associated with the object for during the second time period, and returning the deny indication if the second access time is during the first time period and the second domain identifier is not one of the domain identifiers in the set of domain identifiers associated with the object for during the first time period.

2. The method of claim 1, wherein the object comprises at least one of a workload partition and a logical partition running the operating system instance.

3. The method of claim 1, wherein the domain isolation rules are stored in a kernel of the operating system instance.

4. The method of claim 1, wherein said determining the first domain identifier associated with the first user further comprises determining that the first domain identifier is indicated in user data that represents a user account logged into a computer system that hosts the operating system instance.

5. The method of claim 1, further comprising accessing a policy database that has a mapping of accounts of users permitted to log into a computer system hosting the operating system instance with the associated domain identifiers of each user and the associated time periods of the plurality of time periods of each domain identifier.

6. The method of claim 5, further comprising dynamically assigning domains to the accounts of users to different ones of the domains at different ones of the plurality of time periods based on login time entitlement rules in the policy database.

7. The method of claim 1, wherein one or more attributes of the domains in the set of domains are stored in a kernel of the operating system instance.

8. The method of claim 7, further comprising retrieving the one or more attributes from the kernel of the operating system instance for validations of users logging into the system.

9. The method of claim 1, wherein the number of users logging into a computer system hosting the operating system instance is limited based on the domain isolation rules containing the mapping across one or more users, one or more domains, and one or more time periods.

10. The method of claim 1, wherein the object is a file system, a file, a disk, a hardware component, or a software component on which timed access can be applied such that the first user gains access to the object after the first user logs into a computer system hosting the operating system instance.

11. The method of claim 1, wherein the first user is also associated with a second domain identifier that identifies a second domain of the plurality of domains representing a second organizational entity of the plurality of organizational entities, and further comprising:
returning a permit indication that the first login access is permitted on the object if the first access time is during the first time period, and the domain isolation rules indicate that the first domain identifier is permitted for the object during the first time period; and
returning a permit indication that the first login access is permitted on the object if the first access time is during a second time period different from the first time period, and the domain isolation rules indicate that the second domain identifier is permitted for the object during the second time period.

12. The method of claim 11, wherein the domain isolation rules are stored in a kernel of the operating system instance.

13. A method comprising:
determining, in an operating system instance, that a first login access is being attempted by a first user at a first access time on an object;
determining a first domain identifier associated with the first user, wherein the first domain identifier identifies a first domain representing a first organizational entity of a plurality of domains representing a plurality of organizational entities;
accessing a set of one or more domain identifiers associated with the object, wherein the set identifies one or more domains of the plurality of domains representing one or more organizational entities of the plurality of organizational entities;
accessing one or more domain isolation rules associated with the operating system instance for permitting an attempted login access to the object during at least a first time period of a plurality of time periods by one or more domains based on whether a domain identifier associated with the first user is one of the domain identifiers in the set of domain identifiers associated with the object for during the first time period;
evaluating the one or more domain isolation rules to determine whether the first login access is permitted on the object at the first access time;
returning a permit indication that the first login access is permitted on the object if the domain isolation rules indicate that the first domain identifier represents a domain that is permitted for the object at the first access time; and returning a deny indication that the first login access is not permitted on the object if the domain isolation rules indicate that the first domain identifier represents a domain that is not permitted for the object at the first access time;

wherein the first user is also associated with a second domain identifier that identifies a second domain of the plurality of domains representing a second organizational entity of the plurality of organizational entities and, returning a permit indication that the first login access is permitted on the object if the first access time is during the first time period, and the domain isolation rules indicate that the first domain identifier is permitted for the object during the first time period; and returning a permit indication that the first login access is permitted on the object if the first access time is during a second time period different from the first time period, and the domain isolation rules indicate that the second domain identifier is permitted for the object during the second time period.

14. The method of claim 13, further comprising returning a deny indication if the first access time is at a time not during the first and second time periods.

15. The method of claim 13, wherein the domain isolation rules are stored in a kernel of the operating system instance.

16. The method of claim 13, determining, in the operating system instance, that a second login access is being attempted on the object at a second access time by a second user associated with a second domain identifier of the plurality of domain identifiers representing a second organizational entity of the plurality of organizational entities;

returning the permit indication for the second user if the second access time is during the second time period and the second domain identifier is one of the domain identifiers in the set of domain identifiers associated with the object for during the second time period; and returning the deny indication if the second access time is during the first time period and the second domain identifier is not one of the domain identifiers in the set of domain identifiers associated with the object for during the first time period.

17. A system for determining login access, comprising:
a processing device;
a memory; and
a records display program including a plurality of instructions stored in the memory that, in response to selection of an attribute, are executed by the processing device to:
determine, in an operating system instance, that a login access is being attempted by a user at an access time on an object,
determine, in an operating system instance, that a second login access is being attempted by a second user at a second access time on the object,
determine a domain identifier associated with the user, wherein the domain identifier identifies a domain representing an organizational entity of a plurality of domains representing a plurality of organizational entities,
determine a second domain identifier associated with the second user, wherein the second domain identifier identifies a second domain representing a second organizational entity of the plurality of domains representing the plurality of organizational entities,
access a set of one or more domain identifiers associated with the object, wherein the set identifies one or more domains of the plurality of domains representing one or more organizational entities of the plurality of organizational entities,
access one or more domain isolation rules associated with the operating system instance for permitting an attempted login access to the object during a time period of a plurality of time periods by one or more domains based on whether the domain identifier associated with the user is one of the domain identifiers in the set of domain identifiers associated with the object for during the time period,
evaluate the one or more domain isolation rules to determine whether the login access attempted by the user is permitted on the object at the access time,
return a permit indication that the login access is permitted on the object if the domain isolation rules indicate that the domain identifier represents a domain that is permitted for the object at the access time and if the access time is during the time period, and
return a deny indication that the login access is not permitted on the object if the domain isolation rules indicate that the domain identifier represents a domain that is not permitted for the object at the access time and if the access time is during a second time period different from the time period and the domain identifier is not one of the domain identifiers in the set of domain identifiers associated with the object for during the second time period;
evaluate the one or more domain isolation rules to determine whether the second login access is permitted on the object at the second access time;
return the permit indication for the second user if the second access time is during the second time period and the second domain identifier is one of the domain identifiers in the set of domain identifiers associated with the object for during the second time period, and
return the deny indication if the second access time is during the time period and the second domain identifier is not one of the domain identifiers in the set of domain identifiers associated with the object for during the time period.

18. The system of claim 17, wherein the object comprises at least one of a workload partition and a logical partition running an operating system instance.

19. The system of claim 17, wherein the domain isolation rules and one or more attributes of the set of domains are stored in a kernel of the operating system instance.

20. The system of claim 19, wherein the instructions include for retrieval of the one or more attributes of the set of domains from the kernel of the operating system instance for validations of users logging into the system.

21. A computer program product for determining login access, the computer program product comprising:
a non-transitory computer readable storage medium having computer readable program code embodied therewith, the computer readable program code executable by a computer device to:
determine, by the computer device, in an operating system instance, that a login access is being attempted by a user at an access time on an object,
determine by the computer device a domain identifier associated with the user, wherein the domain identifier identifies a domain representing an organizational entity of a plurality of domains representing a plurality of organizational entities,
access by the computer device a set of one or more domain identifiers associated with the object, wherein the set identifies one or more domains of the plurality of domains representing one or more organizational entities of the plurality of organizational entities, access by the computer device one or more domain isolation rules associated with the operating system instance for permitting an attempted login access to the object during a time period of a plurality of time periods by one or more domains based on whether the domain identifier associated with the user is one of the domain identifiers in the set of domain identifiers associated with the object for during the time period, evaluate by the computer device the one or more domain isolation rules to determine whether the login access attempted by the user is permitted on the object at the access time, return by the computer device a permit indication that the login access is permitted on the object if the domain isolation rules indicate that the domain identifier represents a domain that is permitted for the object at the access time, and return by the computer device a deny indication that the login access is not permitted on the object if the domain isolation rules indicate that the domain identifier represents a domain that is not permitted for the object at the access time, wherein the user is also associated with a second domain identifier that identifies a second domain of the plurality of domains representing a second organizational entity of the plurality of organizational entities, and return by the computer device a permit indication that the login access is permitted on the object if the access time is during the time period, and the domain isolation rules indicate that the domain identifier is permitted for the object during the time period; and return by the computer device a permit indication that the first login access is permitted on the object if the access time is during a second time period different from the time period, and the domain isolation rules indicate that the second domain identifier is permitted for the object during the second time period.

22. The computer program product of claim 21, wherein the computer readable program code is further executable by the computer device to dynamically assign by the computer device domains to the accounts of users to different ones of the domains at different ones of the plurality of time periods based on login time permission rules in a policy database.

23. The computer program product of claim 21, wherein the domain isolation rules and one or more attributes of the set of domains are stored in a kernel of the operating system instance.

24. The computer program product of claim 23, wherein the computer readable program code is further executable by the computer device to retrieve by the computer device the one or more attributes of the set of domains from the kernel of the operating system instance for validations of users logging into the system.

25. The computer program product of claim 21, wherein the computer readable program code is further configured to:

determine, by the computer device, in the operating system instance, that a second login access is being attempted on the object at a second access time by a second user associated with a second domain identifier of the plurality of domain identifiers representing a second organizational entity of the plurality of organizational entities;

return by the computer device the permit indication for the second user if the second access time is during the second time period and the second domain identifier is one of the domain identifiers in the set of domain identifiers associated with the object for during the second time period; and return by the computer device the deny indication if the second access time is during the time period and the second domain identifier is not one of the domain identifiers in the set of domain identifiers associated with the object for during the time period.

* * * * *